Nov. 1, 1949.  W. T. KELLEY  2,486,476
DIRECTIONAL SIGNAL AND STOP LIGHT FOR VEHICLES
Filed Feb. 25, 1948  2 Sheets-Sheet 1
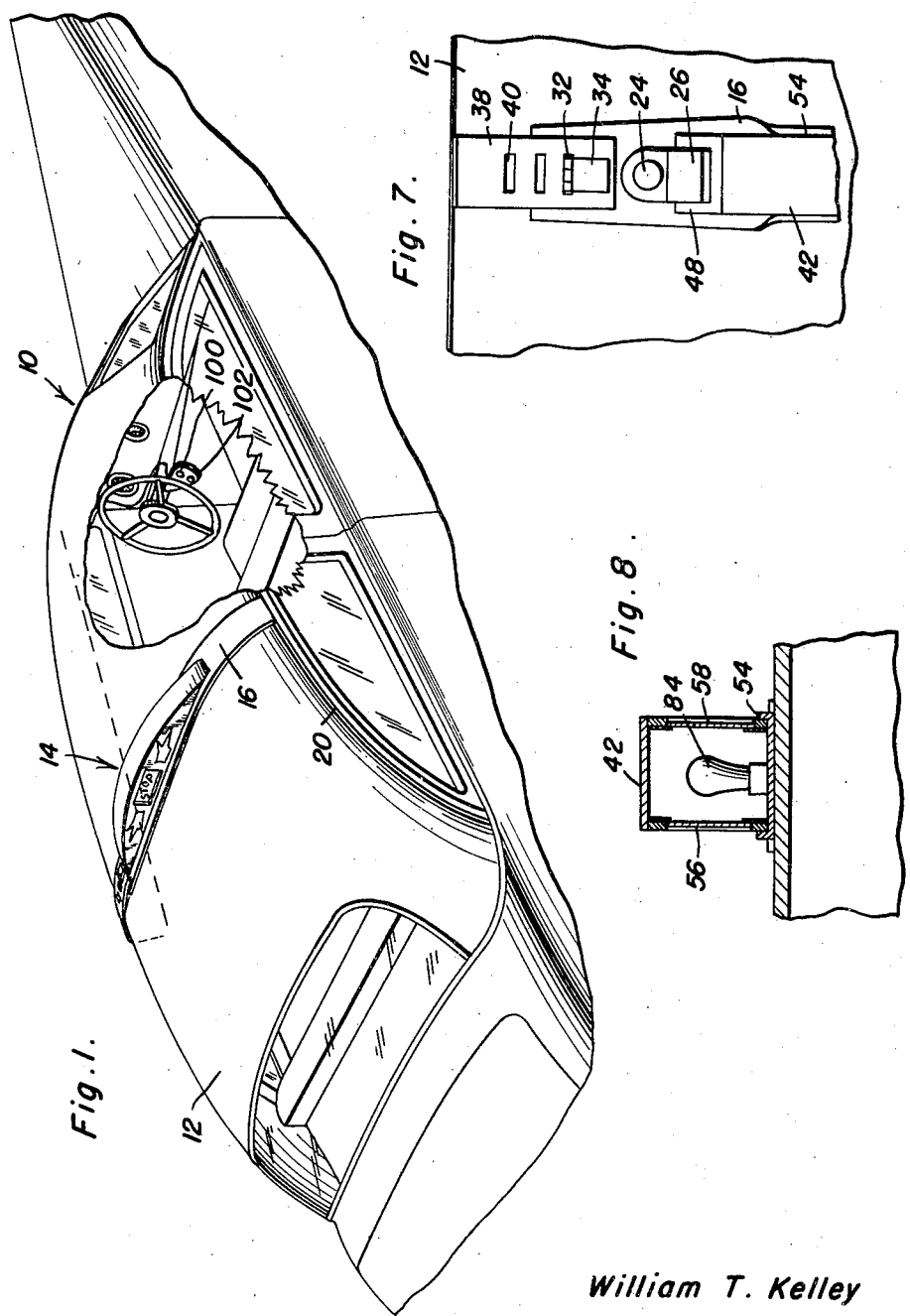
William T. Kelley
INVENTOR.

Nov. 1, 1949.  W. T. KELLEY  2,486,476
DIRECTIONAL SIGNAL AND STOP LIGHT FOR VEHICLES
Filed Feb. 25, 1948  2 Sheets-Sheet 2
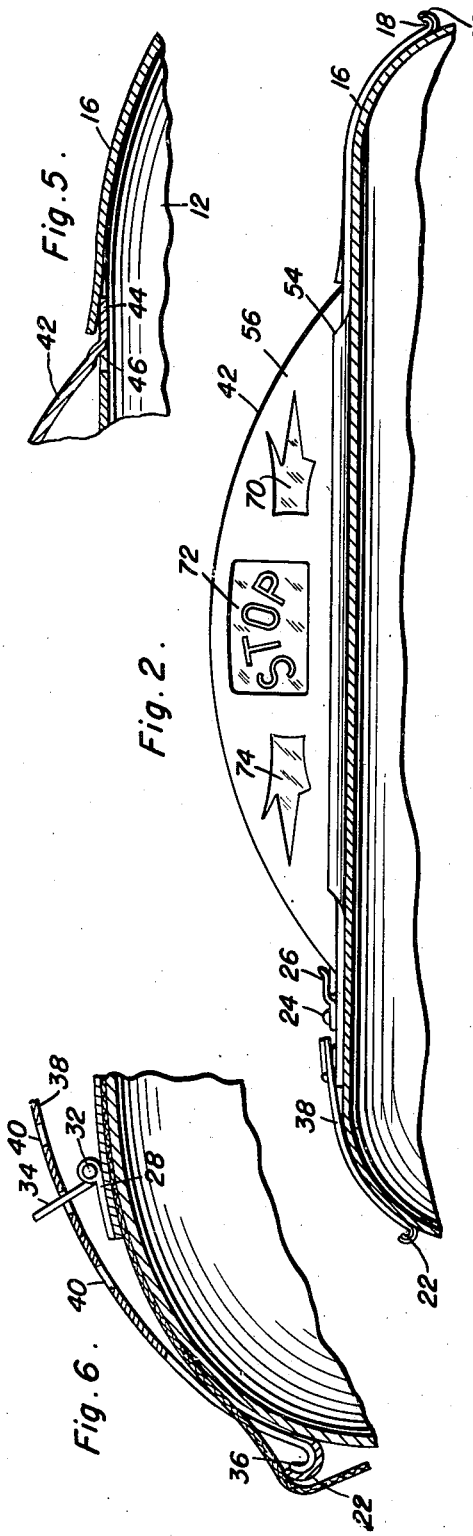
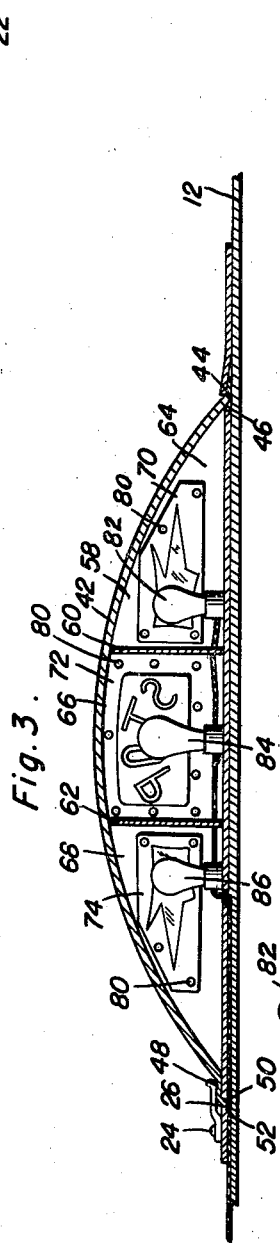
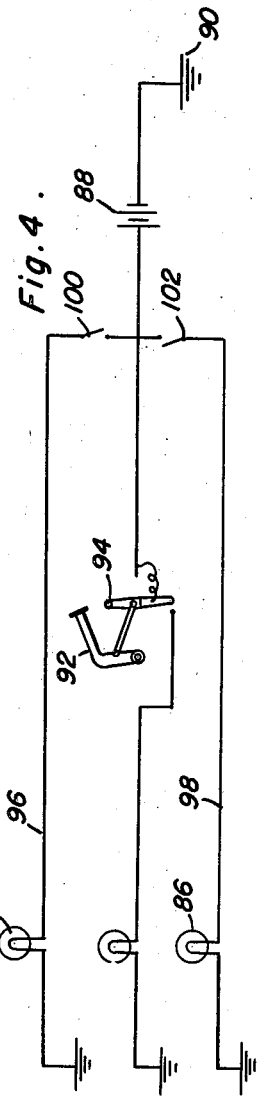
William T. Kelley
INVENTOR.

Patented Nov. 1, 1949

2,486,476

UNITED STATES PATENT OFFICE 2,486,476

DIRECTIONAL SIGNAL AND STOP LIGHT FOR VEHICLES

William T. Kelley, Plainview, Tex.

Application February 25, 1948, Serial No. 10,770

6 Claims. (Cl. 177—329)

This invention relates to a direction and safety signal for motor vehicles and has for its primary object to enable signals of a directional and control type to be visible from both ends of a vehicle so that traffic, oncoming or in a similar directional path, will be apprised of the intentions of a vehicle operator, either to negotiate a turn or to brake his vehicle.

Another object of this invention is to provide a signal exhibitor adapted for installation and utilization on the roof or top of a vehicle that is easily installed and is adjustable to fit any type or model of motor vehicle.

Another object of this invention is to provide a combination directional indicator and stop light that is conspicuously displayed and individually installed and illuminated.

Another object of this invention is to provide a signal device that is inexpensive and economical to manufacture, easily and conveniently installed in any type or model of motor vehicle and which is reliable and durable in utilization and employment.

These and ancillary objects are attained by this invention, a preferred embodiment of which is set forth in the following description and illustrated in the accompanying drawings, wherein:

Figure 1 is a view in perspective of a motor vehicle having a signal device, constructed in accordance with the principles of this invention, attached thereto;

Figure 2 is a rear elevational view of the signal device;

Figure 3 is a vertical sectional view of the signal device with one side removed showing the inner structure thereof;

Figure 4 is a diagrammatic view of the circuit installation of the device;

Figure 5 is a fragmentary enlarged sectional view of one coupling end, shown in Figure 2;

Figure 6 is a sectional view of the opposite coupling end shown generally in Figure 2;

Figure 7 is a plan view of Figure 6; and,

Figure 8 is a transverse medial sectional view of the casing.

Referring now more particularly to the drawings, wherein similar characters of reference designate corresponding parts throughout, there is shown a motor vehicle 10, of conventional construction including a roof 12. Positioned transversely on the roof 12 is a signaling apparatus 14, constructed according to the principles of this invention and comprising an elongated bracket strip 16, having an inturned terminating portion 18, which is received within a longitudinally extending upcurved guard strip 20, formed integrally on the motor vehicle, a similar guard or rain strip 22 being formed on the opposite side of the vehicle and extending similarly longitudinally of the vehicle. The bracket strip or arm 16 extends crosswise on the roof 12 from the rain guard 20 to a point adjacent the opposite side of the roof and has secured thereon by a rivet or bolt 24 a spring clamp 26 for a purpose to be later described. Secured to the bracket arm 16 on the terminating transverse extended portion thereof adjacent the spring clip or clamp 26 is a hinge plate 28, seated on the bracket arm and affixed thereon by suitable attaching means. The hinge plate 28 has pivoted thereto by a pivot pin or pintle 32 a companion plate 34 which has an unattached free end.

Received within the longitudinal guard strip 22 of the vehicle and held therein by the positioning of a complementary similarly configured curved terminal 36 is an extension or adjusting bracket arm or strip 38, having a series of spaced rectangular openings 40 formed therein. The leaf or plate 34 is adapted to be inserted in one of the openings 40, thus serving as an attaching or buckling clip, so that the bracket strips or arms 16 and 38 may be easily and conveniently attached to the roof of a motor vehicle regardless of width or type. Suitably secured on the bracket strip 16 is an arcuate casing top 42, having an extending toe portion 44 inserted within an opening 46 in the strip with the opposite extended lateral base toe 48 held to the strip by means of the spring clip 26, with a depending portion 50 of the toe 48 seated or inserted within a suitable opening 52. The strip 16 has its opposite longitudinal marginal edges upturned defining an extending medial channel bottom piece 54 and positioned between the top section 42 and bottom piece 54 are front and rear plates 56 and 58, having suitable openings disposed therein.

Transverse partition pieces 60 and 62 are suitably secured within the top 42, bottom 54 and sides 56 and 58 and divide the casing into compartments 64, 66 and 68.

Suitably secured to the sides 56 and 58 are transparent or translucent plates 70, 72 and 74, plate 72 being medially placed and having suitable indicia such as stop or the like subscribed thereon, plates 72 and 74 being formed as pointers and positioned in opposite directions, the plates being suitably secured by screws or rivets 80.

Seated on the bottom section 54 are lamps 82, 84 and 86 which, with reference to the diagrammatic view in Figure 4, are installed in separate circuits with a battery 88, grounded conventionally as at 90. A lead wire 92 intends from the battery 88 to the lamp 84, which is installed in circuit, and illuminated when the brake pedal 92 is operated, actuating a switch 94.

Lamps 82 and 86 are installed in circuits 96 and 98 and illuminated by the battery 88 when the switches 100 and 102 are closed, the switches being shown in Figure 1, as secured to the steering column of the vehicle 12 in easy reach of an operator.

Thus it can be seen that there is provided a signaling device, secured to the top of a vehicle, which is viewable from all directions or paths of travel and which conveys, through suitable communication, various vehicular information, such as a turn or stop.

However, since many other modifications and purposes of this invention will become apparent to those skilled in the art, upon a perusal of the foregoing description, in view of the accompanying drawings, it is to be understood that certain changes in size, style and arrangement of parts may be effected thereon, without a departure from the spirit of the invention within the scope of the appended claims.

Having described the invention, what is claimed as new is:

1. A directional and stop signal for use on the roof of a motor vehicle comprising a pair of elongated straps, means for adjustably securing said straps transversely on a vehicle roof, a casing carried by said straps, indicia bearing plates associated with said casing, transverse partitions in said casing defining adjacent compartments, lamps disposed in said compartments in alignment with said plates, means for selectively illuminating said lamps.

2. Combination of claim 1; wherein said securing means includes a series of openings in one of the straps, a pivoted clamp element carried by the other strap for selectively engaging said openings.

3. A directional and stop signal for a vehicle including a pair of supporting members, a casing detachably mounted on one of said members, means for adjustably mounting said member transversely on the roof of a vehicle, transverse partitions in said casing defining adjacent compartments, indicia bearing plates mounted in the side walls of the casing in alignment with said compartments, lamps mounted in said compartments, a source of electrical energy, separate means communicating each of said lamps with the source, manual switches for said means, one of said switches being associated with and operated by the brake pedal of the vehicle.

4. A directional and stop signal for a motor vehicle comprising a pair of supporting straps, a casing detachably mounted on one of said straps, means for securing the outer end of the straps to the longitudinally extending side edges of the roof of a vehicle, a plurality of spaced openings in the inner end of one of the straps, a pivoted clamping element carried by the inner end of the other strap for selective positioning in said openings whereby the inner ends of the straps are clamped together, partitions in said casing defining compartments, lamps mounted in said compartments and means for selectively illuminating said lamps.

5. In a direction and stop signalling device for a motor vehicle, a pair of attaching straps adapted for attachment transversely on the roof of a vehicle, means for adjustably joining said straps together, a lamp casing mounted on one of said straps and having extending toe portions, recesses in said strap for receiving said portions and means for securing said portions in the recesses.

6. In a direction and stop signalling device for a motor vehicle, a pair of attaching straps adapted for attachment transversely on the roof of a motor vehicle, means for adjustably joining the inner ends of the straps together, means for detachably securing the outer ends of the straps to the opposed longitudinally extending side edges of the roof, a lamp casing detachably mounted on one of said straps, transverse partitions in said casing, lamps detachably disposed between said partitions and means for individually illuminating said lamps.

WILLIAM T. KELLEY.

REFERENCES CITED

The following references are of record in the file of this patent:

UNITED STATES PATENTS

| Number | Name | Date |
|---|---|---|
| 1,972,090 | Getty | Sept. 4, 1934 |
| 2,205,169 | Hallman | June 18, 1940 |
| 2,336,905 | Welsh | Dec. 14, 1943 |
| 2,345,979 | Ivey et al. | Apr. 4, 1944 |